United States Patent [19]

Nishiwaki

[11] Patent Number: 4,684,960

[45] Date of Patent: Aug. 4, 1987

[54] THERMOELECTRIC PRINTING APPARATUS

[75] Inventor: Tsutomu Nishiwaki, Suwa, Japan

[73] Assignee: Seiko Epson Kabushiki Kaisha, Tokyo, Japan

[21] Appl. No.: 715,555

[22] Filed: Mar. 25, 1985

[30] Foreign Application Priority Data

Mar. 23, 1984 [JP] Japan .................................. 59-55735
Mar. 23, 1984 [JP] Japan .................................. 59-55736

[51] Int. Cl.[4] .............................................. G01D 15/10

[52] U.S. Cl. ................................ 346/76 PH; 346/163

[58] Field of Search ........... 346/76 PH, 105, 162–164; 400/120, 119; 219/216 PH; 250/318

[56] References Cited

U.S. PATENT DOCUMENTS 4,329,075 5/1982 Applegate et al. ............ 346/76 PH

*Primary Examiner*—Arthur G. Evans

*Attorney, Agent, or Firm*—Blum Kaplan

[57] ABSTRACT

An electrothermal transfer printing apparatus employing an electrothermal transfer film having an ink layer and a resistive layer is used with a print head having a substrate which carries recording electrodes. The recording electrodes are fabricated on the substrate by thick film printing process so as to have a hardness which is controlled relative to that of the substrate. The print head is held in sliding contact with the resistive layer in the transfer film to effect selective heating of the resistive layer for the transfer of ink to a recording body. The angle at which the print head contacts the recording body depends upon the relative hardnesses of the substrate and the electrodes. The print head is cleaned after a predetermined travel of the transfer film over the print head, so that clarity of printing is maintained in spite of the passage of long lengths of electrothermal transfer film.

86 Claims, 27 Drawing Figures

FIG. 1(a)
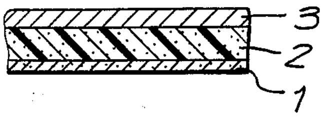
FIG. 1(b)
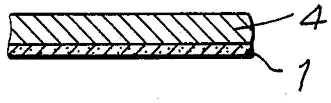
FIG. 1(c)
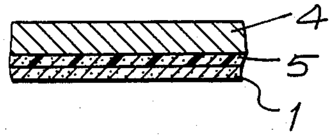
FIG. 2(c)
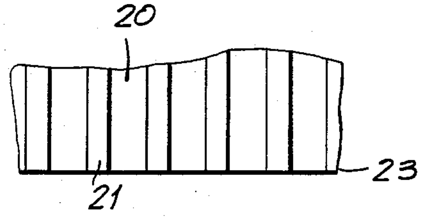
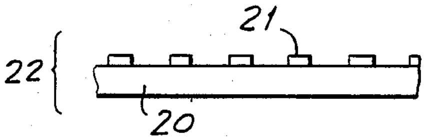
FIG. 2(a)
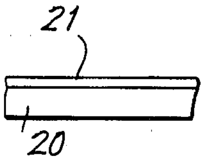
FIG. 2(b)

FIG. 10 (c-1)
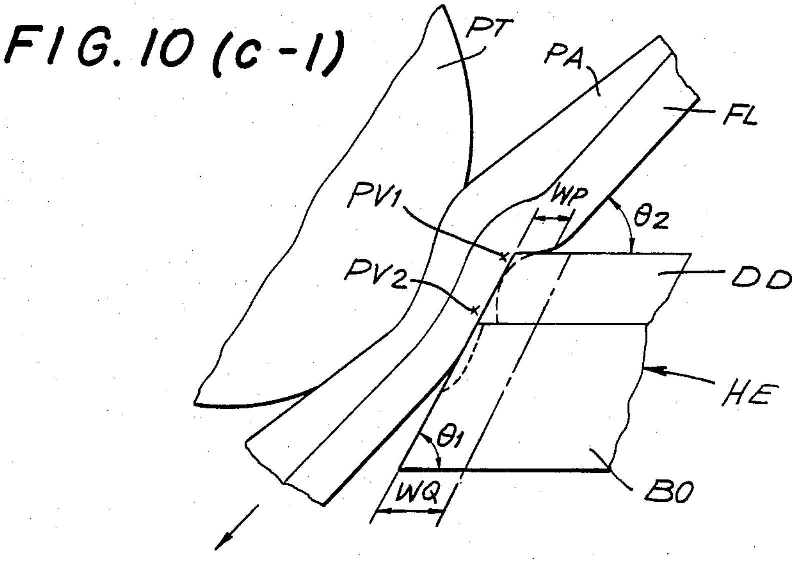
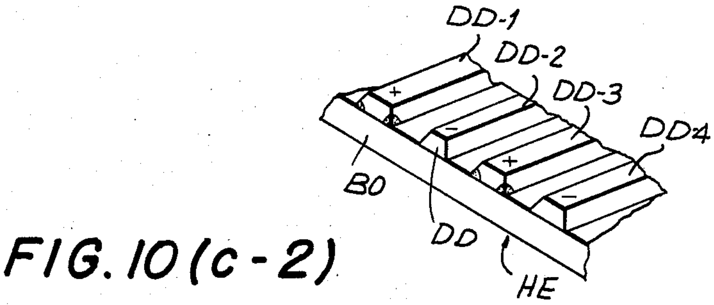
FIG. 10 (c-2)

FIG. 10(d-1)
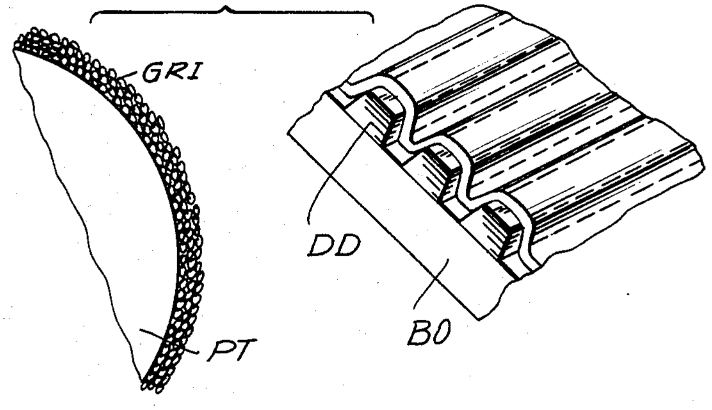
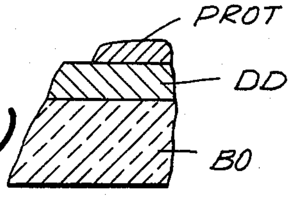
FIG. 10(d-2)
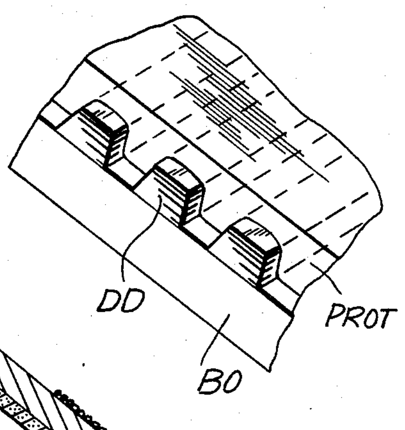
FIG. 10(d-3)
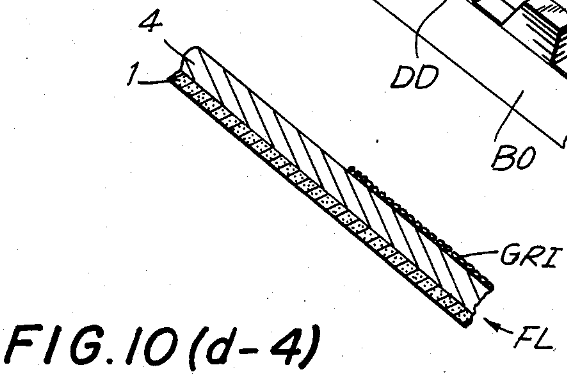
FIG. 10(d-4)

THERMOELECTRIC PRINTING APPARATUS

BACKGROUND OF THE INVENTION

1. Field of the Invention

The present invention relates to a printing apparatus. More particularly, the invention relates to a printing apparatus employing an electrothermal transfer film which can be heated upon electric conduction therethrough. Specifically, the invention relates to a so-called electrothermal printing apparatus for printing characters, figures, or other patterns by using an electrothermal transfer film composed of a resistive layer and an ink layer, by applying a printing signal so as to pass a current higher than a predetermined level through a selected portion of the resistive layer in the film to fuse the thermally fusible ink by Joule heat, and by transferring the fused ink to a recording body such as a paper sheet, a film or the like.

2. Description of the Prior Art

One known electrothermal printing apparatus is disclosed in U.S. Pat. No. 4,350,449 wherein the disclosed printing device effects printing in response to a printing signal applied when a predetermined current is passed through a resistive layer in an ink film. With this device, if electrodes in the print head are not held sufficiently in contact with the resistive layer, then small dots cannot be printed, and dots of different diameters will be printed where larger dot diameters are desired.

Another known apparatus is disclosed in U.S. Pat. No. 4,236,834. The device of this patent uses head electrodes which are constructed as projecting needles, necessitating the use of large inter-electrode pitches which result in an inability to print dots at small pitches. Further, since current passes through each electrode, those electrodes which are better conductors of current wear more rapidly than other electrodes. Therefore, the lengths of the electrodes become irregular during use, with the consequence that the print head electrodes contact the recording body unevenly. The various problems referred to above have made it difficult to put the above-described thermal transfer printing apparatus to practical use.

SUMMARY OF THE INVENTION

A thermal transfer printing apparatus according to the present invention utilizes a print head in which the recording electrodes are formed on a substrate by thick film printing, plating, or the like. Printing is effected by pressing an electrothermal transfer film into contact with the end of the substrate and with the ends of the recording electrodes on the substrate and by moving the electrothermal transfer film and the recording electrodes relative to each other. The print head has a slanted end configuration so that the print head surface will cross the electrothermal transfer film at a prescribed angle when the recording electrodes are pressed there-against for printing.

When printing has been effected for a predetermined length of transfer film, the end of the print head which is held against the electrothermal transfer film is cleaned and reshaped to the desired contour.

Where the recording electrodes are substantially as hard as or softer than the substrate, the angle formed between the electrode-carrying end surface of the print head substrate and the electrothermal transfer sheet differs from the angle formed between the same end surface and the surface which does the cleaning and reshaping. When the recording electrodes are much harder than the substrate, the angles may be equal to each other.

It is an object of the present invention to provide a practical thermal printing apparatus which avoids irregular printing due to contact of print head electrodes with an electrothermal transfer film under uneven pressure.

Another object of the present invention is to provide a printing apparatus and a method for printing which, when used for gradation printing using the method of dot area modulation, will assume that the areas of the dots is varied as a function of the value of the applied current irrespective of the distance the electrothermal transfer film has travelled with respect to the print head, e.g. the wear of the print head, and of the position of print head.

The above and other objects, features and advantages of the present invention will become apparent from the following description when taken in conjunction with the accompanying drawings in which preferred embodiments of the present invention are shown by way of illustrative example.

BRIEF DESCRIPTION OF THE DRAWINGS

For a fuller understanding of the invention, reference is had to the following description taken in connection with the accompanying drawings, in which:

FIGS. 1(*a*) through 1(*c*) are fragmentary cross-sectional views of electrothermal transfer films which can be used with the printing apparatus of the present invention;

FIGS. 2(*a*) through 2(*c*) show a print head and print electrodes in the printing apparatus of the present invention;

FIG. 9(*b*) is a view showing the manner in which printing is effected by the recording electrodes;

DESCRIPTION OF THE PREFERRED EMBODIMENTS

Figure 3:
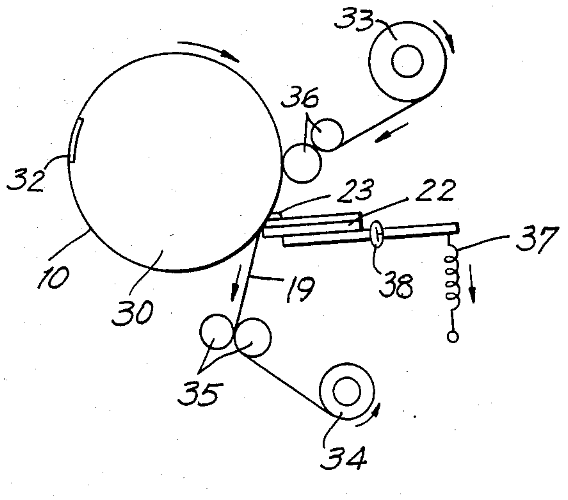
FIG. 3 is a side elevational view illustrating the manner of printing effected by the printing apparatus of the invention.

A printing device according to the present invention will first be described briefly.

FIGS. 1(*a*) through 1(*c*) are sectional views of examples of electrothermal transfer films for use in electrothermal transfer recording which may be used with the printing device of the present invention. In each of FIGS. 1(*a*) through 1(*c*), reference numeral 1 denotes a fusible ink layer composed of wax and a pigment or a dye dispersed therein, the ink layer being thermally fusible at about 60° C. In FIG. 1(*a*) the resin film 2 is made of PET, or the like, or of capacitor paper, and is a layer which supports ink layer 1, which in turn supports an electrically conductive layer 3 (hereinafter referred to as a resistive layer) composed of a resin and a fine powder of carbon dispersed therein. In FIGS. 1(*b*) and 1(*c*), an electrically conductive layer 4 similar to layer 3 serves to support the ink layer. A layer 5 for preventing color turbidity consists of a heat-resistant resin and is positioned between ink layer 1 and conductive layer 4. The ink layer can be fused by Joule heat generated by passing a current through the resistive layer of the film, and the fused ink layer can then be transferred to a transfer sheet for printing.

FIGS. 2(*a*) through 2(*c*) respectively show an end view, a fragmentary cross-sectional view through an electrode, and a fragmentary top view of a print head 22 for use in the electrothermal transfer recording which is used in the printing apparatus of the present invention. Electrodes 21 are integrally laid down on substrate 20 as more fully described below, to produce an end surface 23.

FIG. 3 illustrates the manner in which print head 22 contacts electrothermal transfer film 19 in the printing apparatus for the invention. Main roller or platen 30 is formed of a resilient material such as rubber with a transfer body, which may be a paper sheet 10 wound therearound and held thereto by a fixture 32. The electrothermal transfer film 19 is reeled off of film roll 33, delivered by feed rollers 35, 36 in the direction of the arrows, and wound around takeup roll 34. The print head 22 is urged by a spring 37 to turn about a pivot 38 in a direction which keeps the end 23 of the print head pressed against the main roller 30. By pressing the end 23 of the print head 22 having the construction of FIG. 2 against the electrothermal transfer film, there is assured a good electrical connection between the recording electrodes of the print head and the resistive layer in the film.

Figure 4A:
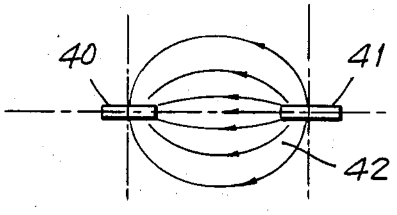
FIGS. 4(*a*) through 4(*c*) are diagrams showing the manner in which thermal printing is carried out by the apparatus of the invention.
Figure 4B:
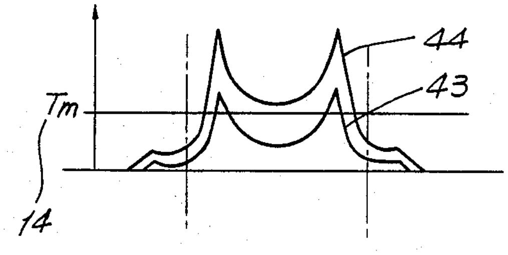
Figure 4C:
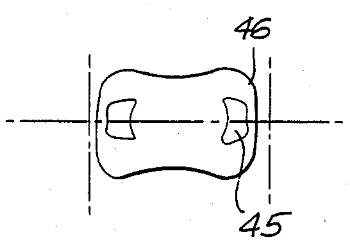

FIGS. 4(*a*) through 4(*c*) illustrate the manner in which the recording electrodes of the printing head of the present invention effect thermal printing. End portions 40, 41 of the recording electrodes are held in contact with the resistive layer of the film, causing currents 42 to flow in the resistive layer when a voltage is applied such that electrode 40 is at a negative potential and electrode 41 at a positive potential. By varying the length of time of application of the voltage, the ink layer attains the different temperature distributions indicated by curves 43 and 44. Curve 43 represents a shorter conduction time, and curve 44 a longer conduction time. The resulting different temperature distributions over the ink layer result in transfer of different ink configurations 45, 56 as shown in FIG. 4(*c*). Therefore, it is possible, in addition to mere printing, to produce gradations in area. FIGS. 4(*a*) through 4(*c*) show one example of a printing process used in the printing apparatus of the invention, in which voltages of different polarities are applied between adjacent recording electrodes. Where voltages are applied for printing in this manner across adjacent recording electrodes, a crosstalk-free multiplex driving mode can be obtained by simultaneously printing dots which are several dots apart and by subsequently applying voltages between the electrodes to print the intervening dots at different times, thereby effecting printing.

Figure 5:
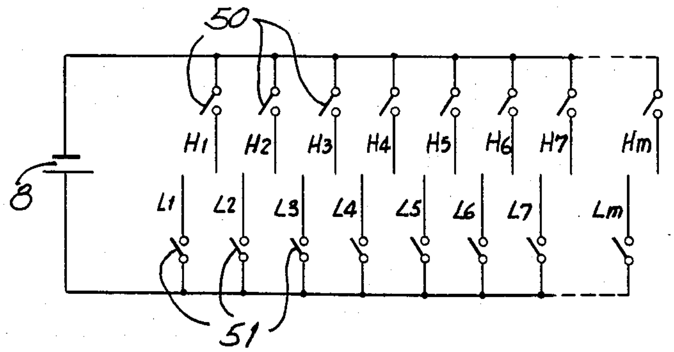
FIG. 5 is a diagram of a switching arrangement for causing printing by the printing electrodes of the present invention.

FIG. 5 shows a switching arrangement for effecting the process of FIG. 4 so as to record between all of the recording electrodes. Switches 50 are connected to the positive terminal of a power supply 8 and switches 51 are connected to the negative terminal of the power supply 8. The switches are connected alternately in pairs to recording electrodes H1 through Hm and L1 through Lm. The number of the recording electrodes is 2×m (m is a positive integer), and the number of recording pixels provided thereby is 2×m−1. This arrangement makes it possible to provide a high-speed, full-color printing apparatus which is capable of printing high-quality images.

PRINTING MECHANISM

Figure 6:
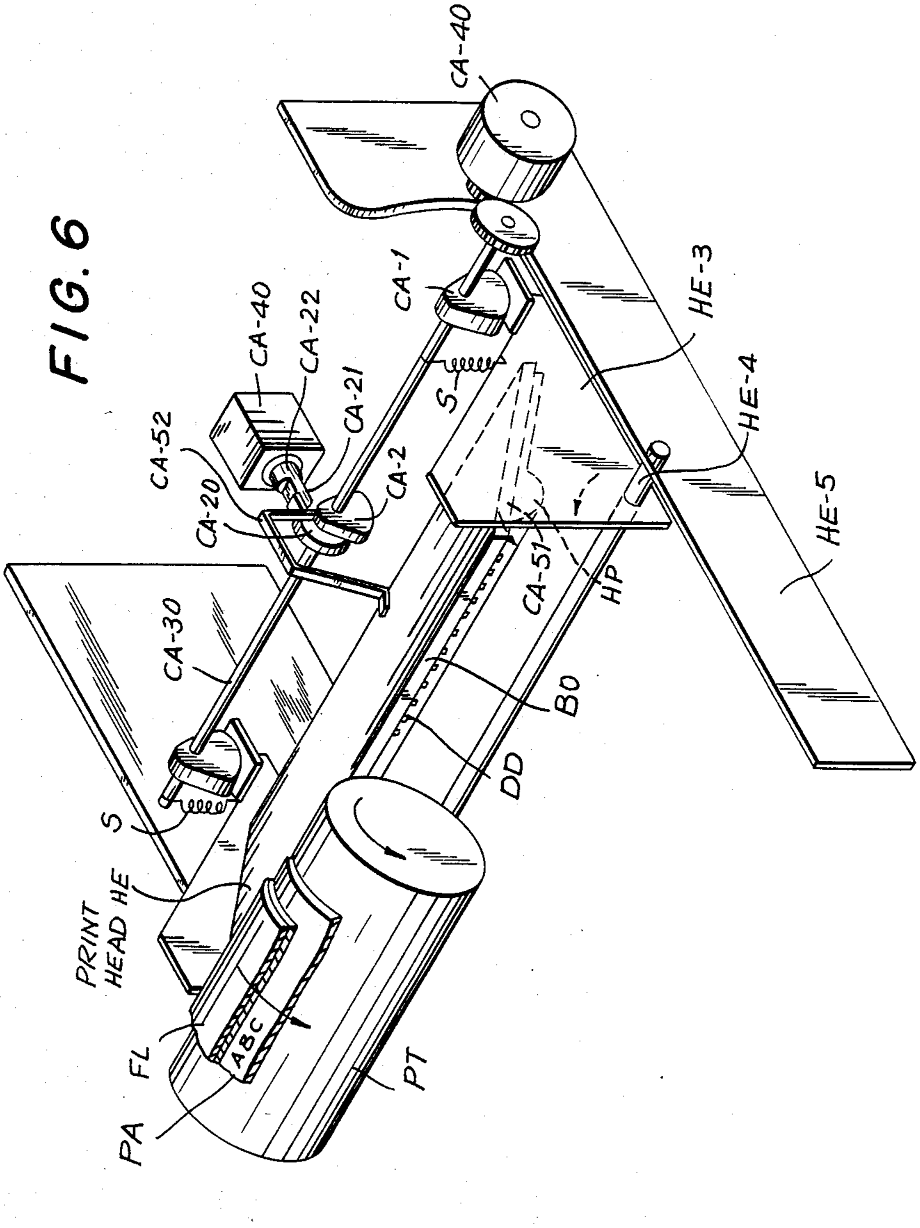
FIG. 6 is a perspective view of the printing mechanism used in the printing apparatus of the present invention.

The printing mechanism of FIG. 6 has been constructed for conducting various tests of the printing apparatus of the present invention. This illustrative printing mechanism will be described below.

A pring head HE is composed of a substrate BO and recording electrodes DD formed on the reverse side thereof. Between the print head HE and a roller or platen PT, there are disposed an electrothermal transfer film FL and a transfer recording body PA, such as paper, which are pressed against the platen PT by the spring-loaded recording head HE during printing. While the film FL and the recording body PA are pressed against the platen PT, an end of the print head HE having the recording electrodes DD on the reverse side thereof is held in abutment against the electrothermal transfer film FL and transfer recording body PA. The electrothermal transfer film FL is arranged so that the resistive layer faces the print head HE while the ink layer faces transfer recording body PA. In the printing mode, the electrothermal transfer film FL and the recording body PA are moved in the direction of the arrow and data items are successively printed on the transfer body PA. The platen PT is relatively soft as it has a hardness in the range of from 20° to 50°.

Figure 7:
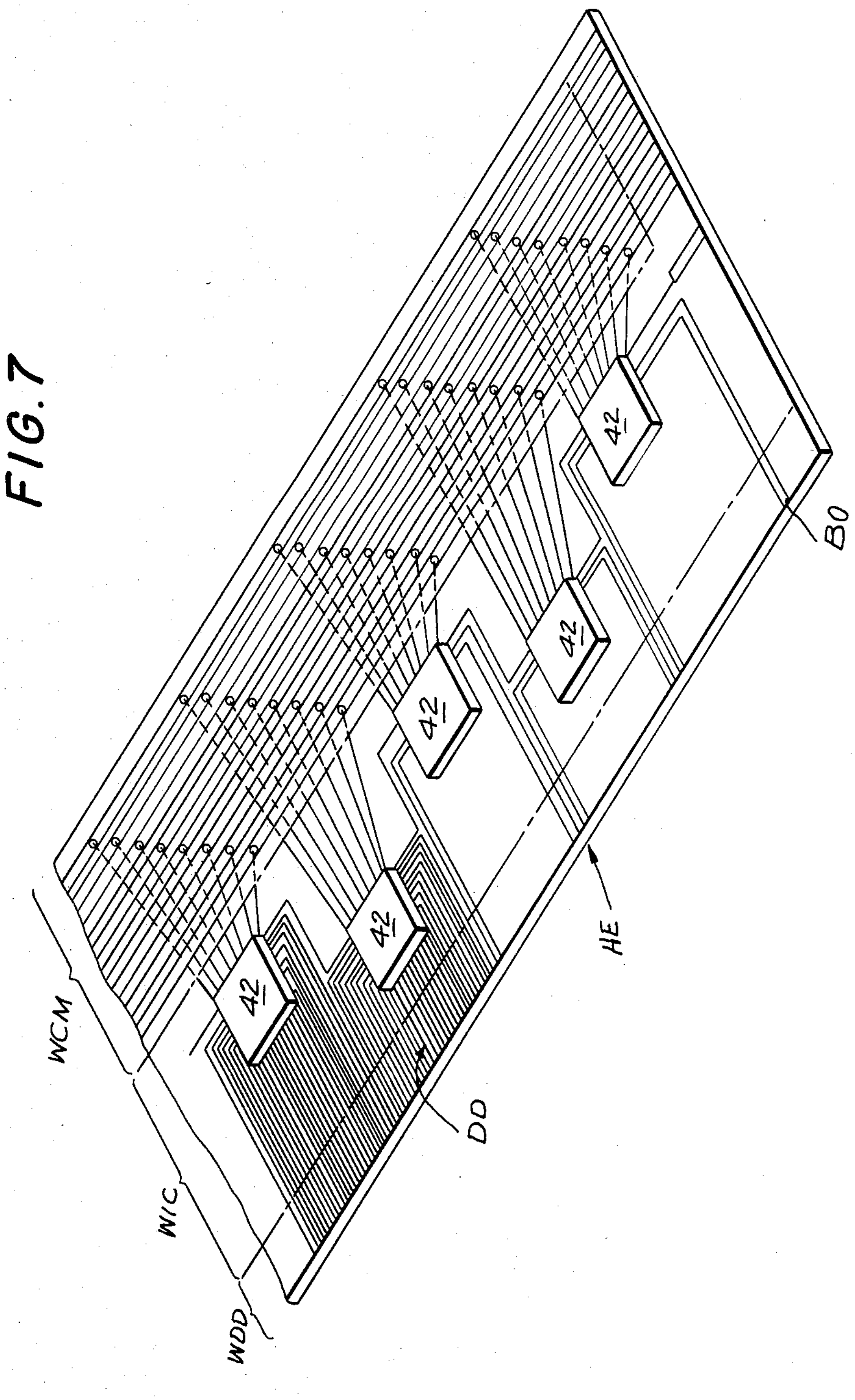
FIG. 7 is a perspective view of an electrode-carrying substrate used in a print head in the printing apparatus of the present invention.
Figure 8:
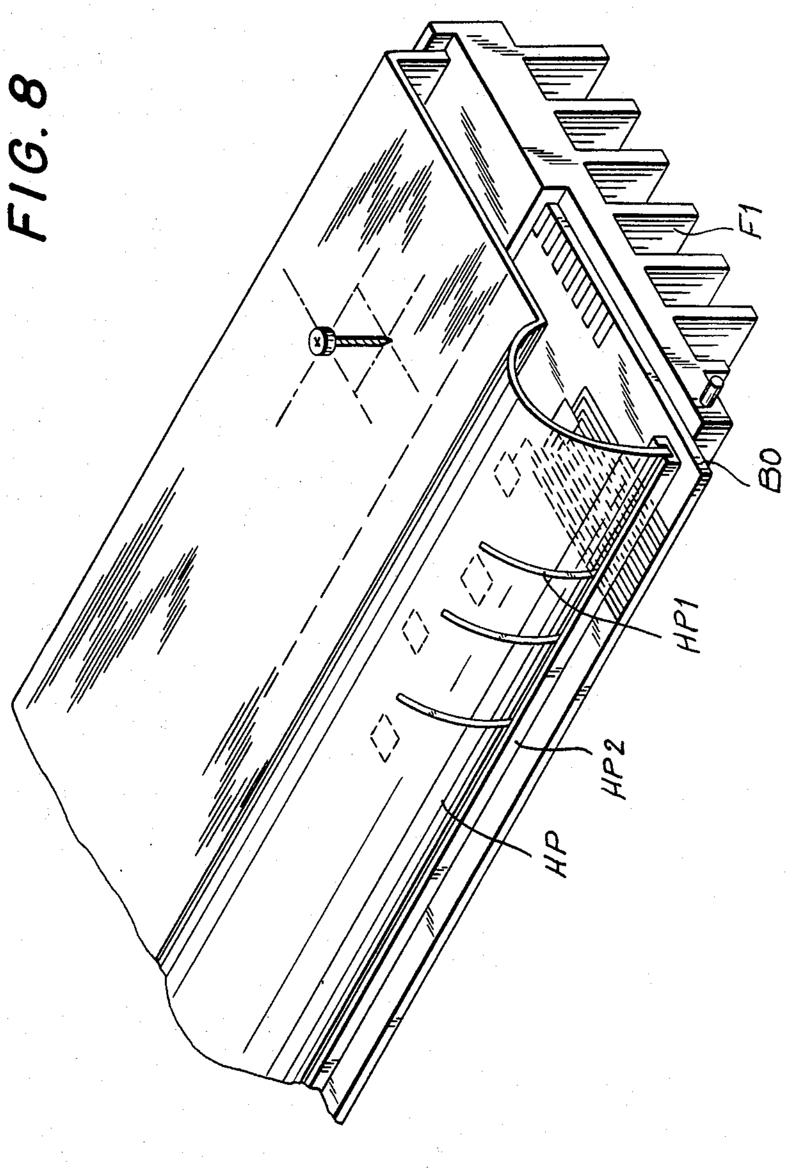
FIG. 8 is a fragmentary perspective view of the assembled print head.

The construction of print head HE in the printing mechanism of FIG. 6 is shown in FIG. 7, with the substrate BO fixed in position by head holder HP as illustrated in FIG. 8. The views of print head HE and holder HP shown in FIGS. 7 and 8 can be obtained by looking at the assembled apparatus in FIG. 6 from below.

In FIG. 7, the print head HE consists of: a recording electrode section WDD which is conveniently 1 to 5 mm in depth and carries recording electrodes DD having a thickness ranging from about 10 to 30 μm and formed by thick film printing, plating, or the like; mounting section WIC for IC drivers 42 which transmit driving signals to the recording electrodes DD; and a common electrode signal wiring section WCM in which latch signal wires, power supply wires, and the like, are formed. All of the sections are mounted on the substrate BO, which has a thickness ranging from about 0.5 to 3 mm. The common electrode signal wiring section WCM has two layers of electrode wires. The ICs 42 in the driver IC mounting section WIC are arranged in a staggered fashion on the substrate BO and bonded face down. Each of the IC chips includes a register, a latch, and a driver.

As shown in FIG. 8, the substrate BO is fastened to heat radiation fins FI and held down by a springy head holder HP. The head holder HP is made of a metal such as aluminum or iron, or of a plastic, and has a curved section by which the substrate BO is held down. The head holder HP has slits HP-1 which provide individually acting portions which hold the substrate BO with an increased efficiency, and cooperates with an auxiliary holder plate HP-2 to uniformly hold the substrate BO.

The printing mechanism of FIG. 6 will now be further described. The printing mechanism employs head-raising cams CA-1 to press the print head HE against the ink film FL on platen PT and to release the print head HE off the platen PT. The printing mechanism also includes a head angle positioning cam CA-2 for changing the angle of the print head HE with respect to the platen PT when an abrasive sheet is used in place of the electrothermal ink transfer film for cleaning and reshaping the print head.

The print head HE is supported by pivots CA-51 on head side support members HE-3. Side support members HE-3 are, in turn, carried on side pivots HE-4 which are journalled in printing frame HE-5. A lever or cam follower CA-52 is supported on head HE and contacts the head angle changing cam CA-2. The head raising cams CA-1 serve to lift the front end of the print head off the platen PT to allow feeding of the transfer recording sheet PA and the electrothermal transfer film FL smoothly when printing is not to be effected. The head raising cams CA-1 are fixed to a cam drive shaft CA-30 which is operatively coupled to a cam drive motor CA-40. When cam drive motor CA-40 is energized, the head raising cams CA-1 are rotated about their own axes to permit springs S to raise the head support members HE-3.

The head angle changing cam CA-2 does not turn with shaft CA-30 but is secured to a head angle changing plate CA-20 by means of a coil spring (not shown) which is disposed around the cam drive shaft CA-30. When head angle changing plate CA-20 is engaged by the finger CA-21 on the iron core CA-22 of plunger CA-40, it cannot be turned about its axis. The coil spring around the cam drive shaft CA-30 is thus kept loose thereon, and no driving force is transmitted to the head angle changing cam CA-2 even when the cam drive shaft CA-30 is rotated. However, when the plunger CA-40 is energized so as to attract the iron core and head angle changing plate CA-20 is released by finger CA-21, the coil spring winds around cam drive shaft CA-30 and transmits driving force to head angle changing cam CA-2, whereupon the cam follower CA-52 is raised, rotating print head HE.

Figure 9A:
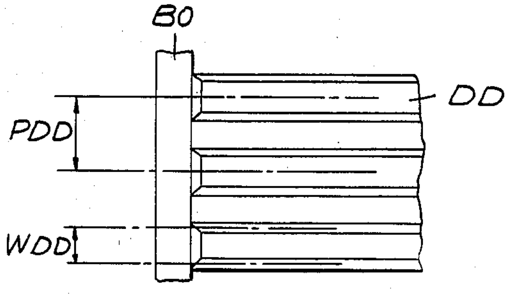
FIG. 9(*a*) is a fragmentary plan view of the recording electrodes.
Figure 9B:
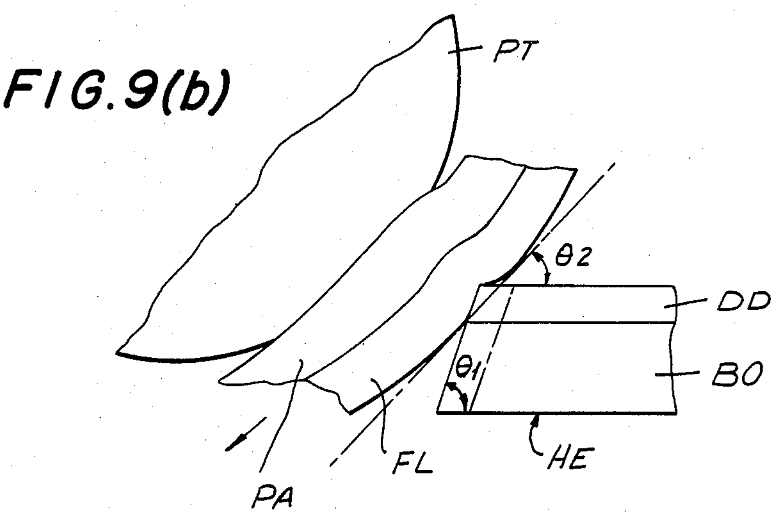

In the following, the angle formed between the plane of the substrate BO of print head HE and the end surface where electrothermal transfer film FL contacts the print head HE during printing is expressed by Θ1, and the angle between the plane of the print head HE and a cleaning material (such as abrasive paper, an abrasive platen, or the like) used for cleaning the front end of print head HE is expressed by Θ2. The relationship between angles Θ1 and Θ2 is illustrated in FIG. 9(*b*). FIGS. 9(*a*) and 9(*b*) are plan and side elevational views, respectively, of a portion of the print head HE. As seen in FIG. 9(*a*), the recording electrodes DD are formed on the substrate BO with an average electrode width of WDD and a pitch PDD. The angles Θ2 of FIG. 9(*b*) can easily be changed by means of the head angle-changing cam CA-2.

Where the electrothermal transfer film FL and the recording body PA are to be fed along in a so-called "paper feed" or "sheet feed" mode, the head raising cams CA-1 are first turned, using the foregoing mechanism, to press their longer radius portions against the head support members HE-3 so as to lift the print head HE off of the platen PT (the position shown in FIG. 6). The electrothermal transfer film FL and the recording body PA can then be fed along without being pressed against the print head HE for printing. For pressing the print head HE toward the platen PT, or truing the print head HE with a cleaning material such as an abrasive material, which may be coated on the surface of the platen PT, or carried on an abrasive sheet put in place of the electrothermal transfer film (FL), the head support members HE-3 are allowed to be raised by spring S by turning to the shorter radius portions of head raising cams CA-1. The head angle is selected to be Θ1 or Θ2 by means of the head angle changing cam CA-2.

The positions of the cams for the various modes of operation of the printing mechanism of FIG. 6 are shown in Table 1.

TABLE 1

| CAM | MODE: PRINTING | MODE: FILM OR PAPER DISPLACEMENT | MODE: CLEANING |
|---|---|---|---|
| HEAD RAISING CAM (presses head or releases head from platen) | Pressed (with shorter cam radius) | Released (with longer cam radius) | Pressed (with shorter cam radius,) |
| HEAD ANGLE CAM (angle between film and print head) | Used with shorter cam radius (θ2) | Not used | Used with longer cam radius (θ1) |

It is apparent that Θ1=Θ2 when the head angle changing cam CA-2 is not rotated.

COMPARISON BETWEEN ELECTRODE HARDNESS AND SUBSTRATE HARDNESS

Using the apparatus of FIGS. 6, 7 and 8, various tests were conducted to determine the effect of various hardnesses of the recording electrodes DD and of the substrate BO of print head HE. The pitch PDD of the recording electrodes DD was 320 μm, the electrode width WDD was 180 μm, the thickness of the recording electrodes DD was 20 μm, the number of the recording electrodes DD was 640, and the width of the recording section was about 205 mm. Θ1=Θ2=45 degrees.

Measurements were made whenever any one of the 640 electrodes failed to print or when discontinuous printing resulted after one refreshing (cleaning) cycle was effected. Printing was carried out (without intermediate, cleaning) while feeding the electrothermal transfer film.

Table 2 shows the results of the above experiments. The substrates BO used were as follows. In the uppermost block of the left hand column, the substrate BO was formed of porous alumina which can be of a hardness ranging from 500 to 1000 HV (Vickers units), and the recording electrode DD was formed of tungsten which can have a hardness in the range of from 700 to 1000 HV. The uppermost block in the lefthand column indicates the experimental result when the print head substrate BO was made of porous alumina with a hardness of 900 HV and the recording electrodes DD were formed of tungsten having a hardness of 800 HV. The experimental result was that a print failure occurred when the distance travelled by an electrothermal transfer film past the print head was 5 m or less, this result being marked "x".

Where the substrate BO was formed of a material mainly composed of magnesium, silicon, aluminum, potassium, fluorine and oxygen, and fluorine having a hardness of 200 HV and the recording electrodes DD were formed of tungsten with a hardness of 800 HV, the experimental result as shown in the uppermost, right hand, data block, was that no print failure occurred when the distance of travel of an electrothermal transfer film past the print head was 100 m or more, the condition being marked " ⊙ ".

Those print heads marked with "x" in the respective data blocks actually suffered from a print failure when the distance of travel of transfer film FL was in the range of 2 to 3 m. Thus, where the hardness of the recording electrodes DD is significantly greater than that of the substrate BO, the cleaning interval may be 100 m or more, but where the recording electrodes DD and the substrate BO have about the same hardness, the print head must be cleaned frequently and is of low practical value for use in printing apparatus under actual working conditions.

A print head composed of a substrate formed of ceramics having a hardness of 750 HV and recording electrodes formed of tungsten molybdenum having the same hardness was marked with "x", and a print head having a substrate formed of ceramics having a hardness of 800 HV and recording electrodes formed of tungsten molybdenum having a hardness of 700 HV was also marked "x".

Where the substrate BO was made of magnesium and other compositions having a hardness of 300 HV and the recording electrodes DD were formed of molybdenum having 400 HV, the result was "   ".

The above experimental results were produced because the recording electrodes DD and the substrate BO of print head HE were pressed and slid simultaneously against the electrothermal transfer film FL and the ends of the recording electrodes DD were worn simultaneously (immediately) when the recording electrodes DD and the substrate BO head have the same hardness. The result is that the recording electrodes DD will not be held sufficiently against the electrothermal transfer film FL.

TABLE 2

| | SUBSTRATE BO | | |
|---|---|---|---|
| RECORDING ELECTRODE HB | POROUS ALUMINA 500-1000 HV | FOSTERITE ceramics 700-900 HV | COMPOSITE (magnesium, silicon, aluminum, potassium, fluorine and oxygen) 200-300 HV |
| TUNGSTEN | 800/900 HV* | 800/900 HV | 800/200 HV |
| 700-1000 HV | x | x | ⊙ |
| TUNGSTEN-MOLYBDENUM | 700/900 HV | 700/800 HV | 700/200 HV |
| 700-800 HV | x | x | ⊙ |
| MOLYBDENUM-MANGANESE | 600/900 HV | 600/800 HV | 600/300 HV |
| 500-700 HV | x | x | ⊙ |
| MOLYBDENUM | 500/900 HV | 500/800 HV | 500/200 HV |
| 400-650 HV | x | x | ⊙ |
| MANGANESE | 700/900 HV | 400/800 HV | — |
| 300-500 HV | x | x | |

*The first number of each entry is the hardness of recording electrode HB and the second is the hardness of substrate BO.

Distances of travel of the transfer film (wear) required to produce lower image quality in Table 2 above and Table 3 below are defined as follows:

⊙ : 80-100 m or more

O: 50-60 m

Δ: 20-25 m x: 5 m or less.

EXPERIMENTS WITH DIFFERING Θ1 AND Θ2

Similar experiments were conducted under substantially the same conditions as above except that Θ1 was 50 degrees and Θ2 was 40 degrees. The results are shown in Table 3.

Here, there were no printing heads which were evaluated as "x", completely inappropriate for use.

A print head HE composed of a substrate BO of forsterite ceramic having a hardness of 750 HV and recording electrodes DD of tungsten molybdenum having the same hardness was evaluated "O", and a print head HE having a substrate BO of forsterite ceramic having a hardness of 800 HV and recording electrodes DD of tungsten molybdenum having a hardness of 700 HV was also evaluated "O".

A print head HE composed of a substrate BO of the composition of manganese oxide and others having a hardness of 300 HV and recording electrodes DD of molybdenum having a hardness of 400 HV was evaluated " ⊙ ".

It can be understood that those combinations of material evaluated "Δ" should be cleaned after use resulting from travel of the transfer film for distances ranging from 20 to 50 m past the print head. A printing apparatus which requires cleaning after transfer film travel past the print head for distances of 20 m or more is sufficiently practical for use.

Those combinations of material marked with “O” should be cleaned for each such travel distance ranging from 50 to 100 m, and those material combinations marked with “ ” can be cleaned after travel distances of 100 m or more.

TABLE 3

| | SUBSTRATE BO | | |
|---|---|---|---|
| RECORDING ELECTRODE DD | POROUS ALUMINA | FORSTERITE ceramics | COMPOSITE (magnesium, silicon, aluminum, potassium, fluorine and oxygen) |
| TUNGSTEN | 800/900 HV* | 800/900 HV | 800/200 HV ◎ |
| TUNGSTEN-MOLYBDENUM | 700/900 HV | 700/800 HV | 700/200 HV ◎ |
| MOLYBDENUM-MANGANESE | 600/900 HV Δ | 600/800 HV | 600/300 HV ◎ |
| MOLYBDENUM | 500/900 HV Δ | 500/800 HV Δ | 500/200 HV ◎ |
| MANGANESE | 700/900 HV Δ | 400/800 HV Δ | — |

*The first number of each entry is the hardness of recording electrode HB and the second is the hardness of substrate BO.

The results above were obtained for the reason that, with the differing angles Θ1 and Θ2, the limit of wear on the ends of recording electrodes DD is extended until the ends of the recording electrodes DD are worn down to the substrate BO, so that the cleaning from the end of the substrate to a new end can be increased into a practical range.

CLEANING

The relationship between changes in shape of the recording electrodes DD and cleaning thereof will now be described.

Figure 10A:
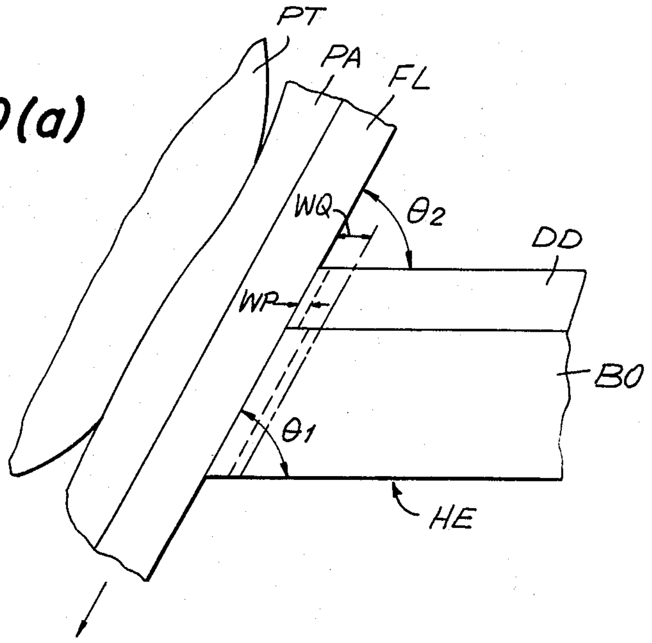
FIGS. 10(*a*), (*b*), (*c*-1), (*c*-2), (*d*-1), (*d*-2), (*d*-3) and (*d*-4) are views illustrating embodiments of the printing electrodes of the present invention under various conditions of use.
Figure 10B:
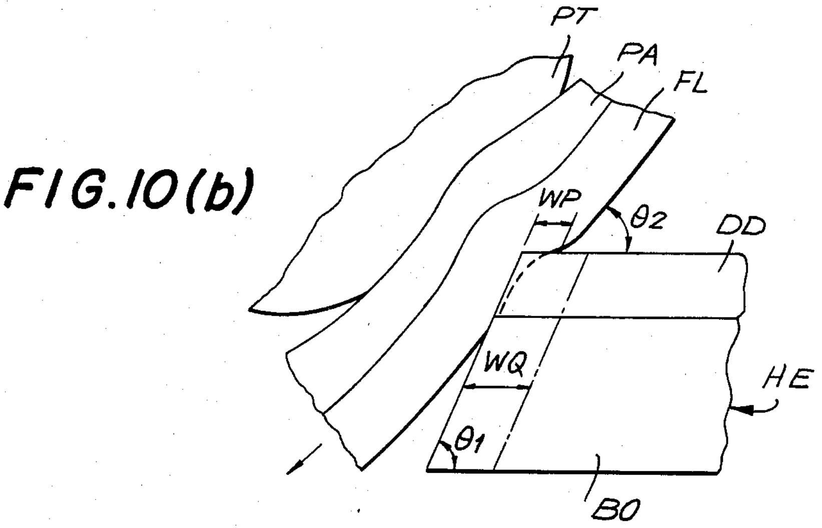

In general, FIG. 10 shows the manner in which the print head HE and the electrothermal transfer film FL are held in contact with each other during printing.

Designated at PA is the transfer recording body. The electrothermal transfer film FL is shown with the ink layer and the resistive layer omitted. The electrothermal transfer film FL is moved in the direction of the arrow with respect to the print head HE. However, the print head HE may be moved in an opposite direction, or both the print head HE and the electrothermal transfer film FL may be moved.

FIG. 10(*a*) shows conditions in which the hardness of recording electrodes DD is significantly larger than the hardness of substrate BO. In FIG. 10(*a*), the angles Θ1 and Θ2 are substantially the same as each other; they may be different from each other as shown in FIG. 10(*b*) and as described above. The end of print head HE changes in shape due to printing wear as indicated by the dashed lines, and at the time of cleaning has the shape indicted by the chain lines.

The distance from the end of the print head after cleaning to the point where the recording electrodes are worn to the largest extent is denoted WP. Since the hardness of recording electrodes DD in FIG. 10(*a*) is significantly larger than the hardness of substrate BO, the recording electrodes DD project beyond the substrate BO. Therefore, essentially no cleaning is required.

When recording electrodes DD are exposed and it is necessary to prevent short-circuiting or leakage between the recording electrodes DD which is due to the presence therebetween of conductive dust or the like, the recording electrodes DD should be cleaned. By covering the recording electrodes DD with a protective insulating layer, the above condition can be substantially improved.

FIG. 10(*b*) shows the condition in which the hardness of recording electrodes DD is equal to or less than the hardness of the substrate BO. In this case, the worn recording electrodes DD and substrate BO are shaped as indicated by the dotted line.

FIG. 10(*c*-1) illustrates a special case of the wear condition of FIG. 10(*b*). Here, current has been passed between adjacent recording electrodes DD as shown in FIG. 10(*c*-2) to fuse ink. The change in shape of recording electrodes DD shown by the dotted lines in FIG. 10(*c*-1) is due to an electric discharge which occurs between recording electrodes DD and the resistive layer in electrothermal transfer film FL, in addition to wear on the recording electrodes DD resulting from sliding movement between the print head HE and the electrothermal transfer film FL. As shown in FIG. 10(*c*-1), electrothermal transfer film FL confronts recording electrodes DD at points PV1, PV2. Since angles Θ1 and Θ2 are different and since the electrothermal transfer film FL and recording electrodes DD contact each other under different conditions in the vicinities of points PV1, PV2 (the portion PV1 is under pressure and the portion near point PV2 tends to come off, or the contact pressure on portion wear point PV1 is larger and the contact pressure on the portion of the electrode near point PV2 is smaller), portions of the electrode near to points PV1, PV2 are subjected to different potentials. Therefore, an electric discharge is produced between the electrothermal transfer film FL and recording electrode DD at the portion near point PV2, deforming the portions of the recording electrode DD which lie closer to the substrate BO.

The above condition will be described in greater detail with reference to FIG. 10(*c*-2). In FIG. 10(*c*-2), a recording current is first passed between recording electrodes DD1 and DD2 to effect thermal transfer; then a current is passed between recording electrodes DD2 and DD3 for thermal transfer, and finally a current is passed between recording electrodes DD3 and DD4 for thermal transfer. The recording electrodes DD have fixed polarities as shown. The recording electrodes DD of the positive polarity are deformed, as shown by the shadings, due to an electric discharge.

In the conditions shown in FIGS. 10(*b*), 10(*c*-1), and 10(*c*-2), printing failure occurs when the distance WP is about 0.5 μm (in the range of from about 0.3 μm to 0.7 μm), since printing conditions change due to the changed shape of recording electrodes DD in contact with electrothermal transfer film FL. Thus, where printing is to be effected with a different printed area for a given dot, the area of the dot which is actually produced will be substantially different as a result of only a slight change in shape of the recording electrodes DD.

Therefore, the allowable wear distance WP should be in the range of from about 1 to 2 m.

MATERIALS OF THE SUBSTRATE

Materials useful in the recording electrodes DD and the substrate BO will now be described in detail.

The recording electrodes DD in the print head HE can be made, for example, of compositions containing metal such as tungsten, molybdenum, manganese, or a mixture of these hard metal compositions, in a combination with an insulating material such as alumina, glass powder, glass fiber, or silicon oxide powder.

The substrate BO may also be made of a material such as a porous ceramic composed mainly of alumina, a ceramic composed mainly of magnesium and silicon, or a ceramic composed mainly of magnesium, silicon, aluminun, potassium, fluorine and oxygen.

The substrate BO may be composed solely of the materials indicated above, but may also contain a small amount of lead, zirconium, potassium, or the like mixed in a proportion in the range of from a few to ten and a few percent. Ceramics composed mainly of magnesium and silicon should be of 20 to 30 weight percent of magnesium and 70 to 80 weight percent of silicon. One example of such a ceramic is forsterite. Ceramics composed mainly of magnesium, silicon, aluminum, potassium, fluorine and oxygen may be of 10 to 20 weight percent of magnesium, 40 to 60 weight percent of silicon, 20 to 40 weight percent of aluminum, and 2 to 15 weight percent of potassium and fluorine, the proportion of aluminum, potassium and fluorine being about the same as that of aluminum and potassium while the proportion of fluorine is one-third ($\frac{1}{3}$) to five-sixths (5/6) of the above. One example of such a ceramic is mica.

Where an insulating material is to be mixed with a hard metal or a composition of hard metals, the proportion of the insulating material to be mixed may be in the range of from 5 to 20 percent by weight of the overall weight for making the metal electrodes DD harder.

RELATIONSHIP OF Θ1, Θ2

An experiment was conducted to find optimum angles Θ1, Θ2.

To insure that the electrodes and the ink film are kept well pressed against each other, the angles Θ1, Θ2 should preferably be correlated to meet the requirement $\Theta2=\Theta\frac{1}{2}$. From the standpoint of the mechanism, however, the angles Θ1 and Θ2 should be as close alike as possible to permit design of the mechanism for changing the angle of the print head for ease of operation.

An experiment was carried out under the same conditions as those for the first example and in which recording electrodes DD were made of tungsten molybdenum having a hardness of 700 HV on a substrate BO which was made of forsterite ceramic having a hardness of 800 HV.

The results of the experiment are given in Table 4. The mark "x" indicates failure of proper printing occurred before the distance of transfer film travel had reached 5 m and that the print head is not therefore considered to be suited for practical use in a printing apparatus. The mark " ⊚ " shows that the experimental values shown in Table 3 were attained. The mark "Δ" indicates that the print head needed to be cleaned at values which were half the experimental values in Table 3. Although the head should preferably be used with the angle conditions marked " ⊚ ", it may be used in practice with the angle conditions marked "Δ".

The same results were obtained with a print head having a substrate BO made of forsterite with a hardness of 750 HV and having recording electrodes DD made of tungsten-molybdenum with a hardness of 750 HV. Furthermore, the same results were reached with a print head having a substrate BO which was made of forsterite with a hardness of 800 HV and having recording electrodes DD made of tungsten molybdenum with a hardness of 700 HV.

Thus, the combinations evaluated with "O" and "Δ" in Table 3 produced the same results.

TABLE 4

| θ2 (deg) | 15 | 30 | 45 | 60 | 75 |
|---|---|---|---|---|---|
| θ1-θ2 (deg) | | | | | |
| 0 | x | x | x | x | x |
| 3 | x | Δ | Δ | Δ | x |
| 5 | x | | | | x |
| 10 | x | | | | x |
| 20 | — | | | Δ | x |
| 30 | — | | Δ | Δ | x |
| 40 | — | — | x | x | x |

θ2: The angle of contact between the conductive layer and the print head during printing.
θ1: The angle of contact between abrasive paper and the print head.
$\theta1 \geqq \theta2$

FABRICATION OF THE PRINT HEAD . . . EXAMPLE A

A print head HE was fabricated by a thick film printing process as follows: A material for substrate BO was prepared mainly from 25 to 30 weight percent of manganese oxide and 65 to 70 weight percent of silicon dioxide. The prepared material was crushed and mixed, and then atomized and dried to produce a green sheet. As the material for recording electrodes, tungsten and an organic binder of PET were mixed at a proportion of 9:1 weight percent, and the mixture was crushed and kneaded to produce a conductive paste. The conductive paste was printed on the green sheet, which was then heated in a reducing atmosphere to bake the substrate and the electrodes simultaneously, thus producing the print head. The electrodes had a thickness of 30 μm.

While the cêramic substrate (forsterite) composed mainly of manganese oxide and silicon dioxide has a hardness ranging from 500 to 600 HV, tungsten has a hardness of about 700 HV.

The print head was refreshed for each travel distance of 100 m, using Θ1=50°, Θ2=45°; the print head remained capable of clear printing after a distance of 2000 m had been travelled.

An experiment was carried out with the recording electrode pitch PDD being 254 μm and the electrode width WDD ranging from 0.4–0.7 (100 μm, 120 μm, 140 μm, 160 μm, 170 μm) of pitch PDD, and the same results as in Tables 2 and 3 were obtained.

However, insufficient printing quality was attained when the recording electrode pitch PDD was 0.3 or less. When the recording electrode pitch PDD was greater than 0.8, foreign matter (electrode dust or the like) was deposited between recording electrodes DD, tending to cause a short circuit therebetween.

When an insulating protective layer (e.g., an organic material such as PVA, PET, polysulfone, or polyimide, for example), which had a hardness lower than that of recording electrodes DD, was formed on recording electrodes DD, the insulating protective layer was capable of preventing short-circuits between the recording electrodes. With this arrangement, the protective layer was slightly backed off the electrode tips by cleaning, and good printing was achieved.

The protective layer covers the ends of the electrodes, as well as the spaces between the electrodes. When the ends of the electrodes are cleaned subsequently by the abrasive, as shown in FIGS. 10(*d*-1), 10(*d*-2), and 10(*d*-3), more of protective layer PROT is removed by the abrasive than of electrodes DD because of the relative hardnesses of the materials, so that the ends of the electrodes project out of the protective layer.

FIG. 10(*d*-1) shows the manner in which the contacting portions of electrodes DD on the end of the substrate BO and of protective layer PROT are cleaned.

The substrate BO and electrode DD are ground at the printing end by the grinding material GRI which is mounted on at least part of the surface of the platen PT. The ends of the angled surface of electrodes DD and substrate BO which contact electrothermal transfer film FL along with electrode DD project from protective layer PROT.

FIG. 10(*d*-2) shows an electrode DD in cross-section on substrate BO in which the acute angle end of electrode DD projects from protective layer PROT.

In addition, protective layer PROT' may be formed on electrode DD as shown in FIG. 10(*d*-3). The ends of electrodes DD are caused to project from protective layer PROT' by cleaning.

PRINT HEAD FABRICATED BY ANOTHER PROCESS

A print head HE was fabricated by a thick film printing process as with example A. A substrate BO was made of porous ceramic composed mainly of alumina, while recording electrodes DD were made of a material composed of tungsten and alumina mixed therein. The porous ceramic composed mainly of alumina was produced by baking alumina at a temperature which ranged from 300° to 800° C., lower than the full baking temperature of about 1600° C. for alumina.

The hardness of the porous ceramics composed mainly of alumina ranged from about 200 to 600 HV depending upon the baking temperature and the purity of the alumina. The recording electrodes DD were made of a mixture of tungsten and alumina and had a hardness of 1000 HV.

The print head was refreshed for each distance of travel of transfer film of 300 m with $\Theta 1 = 60°$ and $\Theta 2 = 50°$, and no printing failure was experienced after the distance of travel of 2000 m had been cleared.

In making recording electrodes DD, a prescribed pattern was printed on substrate BO by thick film printing, and then a conducting layer was plated on the printed thick film pattern. The printed thick film should be of a thickness in the range of from 8 to 15 μm, the depth of the plated layer should be in the range of from 5 to 10 μm, and the overall thickness of the electrodes should range from about 10 to 30 μm.

If recording electrodes DD were to be produced by thick film printing only, then the recording electrodes would be likely to collapse. However, where recording electrodes DD of the prescribed thickness are produced by plating on the printed thick film pattern, the recording electrodes DD are more resistant to changes in their shape.

The plating of the electrodes may be by means of electroplating or electroless plating.

EXAMPLE

A substrate BO was made of soda glass (of a hardness ranging from 300 to 600 HV). A thick film pattern having a thickness of 15 μm of silver palladium was printed on the substrate by way of screen printing. Thereafter, the thick film pattern was electroplated with a nickel layer having a thickness of 5 μm and a Vickers hardness of about 600 HV, thus producing recording electrodes DD. The other conditions were the same as those of example A.

Where the layer is to be plated on a thick film, the hardness of the plated layer should be selected as indicated in Table 2.

The thick film may be as described in Table 3, but may be formed of silver paste, gold paste, copper paste, or the like.

The material to be plated onto the thick film may be, in addition to nickel, rhodium or a mixture or composite of Ni and SiC.

After a thick film has been formed all over the substrate BO, a photoresist may be coated thereon and exposed through a film having a prescribed pattern to produce recording electrodes of the desired shape. With this arrangement, it is easy to shape the recording electrodes DD.

Alternatively, a thick film of uniform thickness may be coated on a substrate BO by printing, dipping, brushing, spraying or the like, and thereafter may be patterned to a prescribed shape by photolithography as described above.

The plated layer may be hardened by quenching.

EXAMPLE

A substrate BO was made of soft glass ceramic, and was plated with a nickel layer having a uniform thickness of 20 μm. Substrate BO may be of a hardness ranging from 300 to 600 HV. Although the plated nickel layer originally had a hardness of 600 HV, it was quenched at about 500° C. to a hardness in the range of from 800 to 1200 HV. Thereafter, a predetermined pattern of electrodes DD was formed by photolithography.

A print head having a dot density of 10 dots/mm or more was fabricated. Thereafter, a prescribed pattern of electrodes was formed by photolithography.

EXAMPLE

In the above example, the substrate BO was plated with a layer of uniform thickness, followed by shaping into the desired recording electrode configuration by photolithography. Thereafter, the plated layer was quench-hardened.

As an alternative, the substrate BO may be formed of glass, soft glass ceramics, or the like, and wires of a prescribed diameter may be placed on and fixed to the substrate by means of an inorganic adhesive.

EXAMPLE

Wires of diameters ranging from 100 to 170 μm were placed at equal pitches of 254 μm on a substrate BO of soft glass ceramic, and were then bonded thereto by an inorganic glass adhesive. The other conditions are the same as those in the preceding example. Tungsten wires may be employed to form recording electrodes DD of tungsten of high-purity, high-hardness bulk. The resulting recording electrodes were highly resistant to both electric-discharge and mechanical wear.

The recording electrodes on the substrate BO may be left exposed, but an insulating layer which is softer than the electrodes may be formed entirely thereover on substrate BO. The insulating layer may be made of epoxy resin, acrylic resin, urethane, silicone, PET, or other resins.

EXAMPLE OF GRINDING PROCESS

A length of 15 to 50 m of electrothermal transfer film FL is rolled. A grinding section which is 5 to 30 cm long is then provided on the leading end of the electrothermal transfer film FL by joining a suitably shaped portion of a commercially available abrasive grinding sheet thereto by means of an adhesive, or a double-sided adhesive tape, or by fixing particles of, for example, silicon carbide directly to the surface of the electrothermal transfer film FL using a suitable adhesive.

The above-described electrothermal transfer film FL was used for printing in combination with a print head HE of the character marked with " ◎ " in Table 2, in which the hardness of the recording electrodes DD is greater than that of the substrate BO. With this combination, good printing resulted since the end of the print head HE was cleaned first each time that one roll of electrothermal transfer film FL was consumed for printing.

Printing was then carried out with print heads HE marked with "O" or "Δ" in Table 2, in which the hardness of the recording electrodes DD is the same as or less than that of the substrate BO. In this case, the angle Θ1 was not equal to angle Θ2, but they were related to each other as indicated by Table 4. More specifically, the end of the print head HE was ground at angle Θ1 when electrothermal transfer film FL was first wound back, during which time the cleaning section was pressed against the print head, and printing was effected at angle Θ2.

Likewise, the trailing end of a roll of electrothermal transfer film FL was provided with a grinding section, and the roll was used for a similar cleaning and printing operation. Such an embodiment is depicted in FIG. 10(*d*-4) where grinding material GRI is carried on a section of conductive layer 4 of transfer film FL.

By thus providing a cleaning section on the leading or the trailing section of a roll of electrothermal transfer film FL, the print head can be ground each time the roll is replaced. It is to be noted also that this arrangement can be used when the electrothermal transfer film is composed of an integral electrothermal transfer film and a recording body PA which will be separated after printing. Therefore, the grinding process can be carried out without fail after printing has been effected for a predetermined interval or distance. The user of the printing apparatus is not required to do any special maintenance work on the apparatus.

The length of a roll of electrothermal transfer film FL can also be made longer than the one interval after which the print head must be cleaned by providing grinding sections on the surface of the transfer film at the required intervals.

In still another manner of cleaning the print head, the electrothermal transfer film need not be provided with a cleaning or grinding section. Instead, the number of revolutions of the motor which feeds the electrothermal transfer film may be counted, an interval of printing on the electrothermal transfer film may be optically measured by slits defined in the film, or an interval of printing on the electrothermal transfer film may be magnetically measured by magnetic bodies mounted on the film, so that a light or buzzer signal can be generated when a predetermined printing interval has been completed. When such an alarm signal is generated, a separate cleaning material such as an abrasive sheet may be inserted between the platen PT and the print head HE to clean the end of the print head.

As shown in FIGS. 10(*d*–*l*), the platen PT may also be provided with a cleaning GRI section overall or over part of its surface. With this arrangement, the end of print head HE to be cleaned is, of necessity, held against platen PT and ground by the cleaning section prior to or subsequent to a printing process effected by a roll of electrothermal transfer film.

The above cleaning arrangements can also be realized using the transfer recording body PA instead of the electrothermal transfer film FL.

The electrothermal transfer film FL and the transfer recording body PA may be integrally combined prior to printing and may be separated after printing.

ABRASIVE OR GRINDING MATERIAL

The abrasive or grinding cleaning material may be diamond, silicon carbide, aluminum oxide, or the like. Where such a material is used, it is employed in the form of particles which are bonded to a sheet of paper or plastic, a plastic film, a metal or rubber sheet, a platen, or the like, by means of a binder such as an adhesive, a tacking agent, a double-sided adhesive tape, or the like. Alternatively, the particles may be mixed in a plastic resin, and the mixture may be solidified.

The organic binder may be PET, ethylene butanol, acrylic resin, polystyrene, polycarbonate, polyethylene, general polyesters other than PET, or a mixture of these materials.

Where the width of each recording electrode in the print head HE is about 100 μm, the cleaning material should be of a fineness of about #500 or more since, if the fineness were less, the ends of recording electrodes DD would be subject to breakage when ground. If the cleaning particles were too small, the cleaning efficiency would be lowered. Therefore, the fineness should be below about #2500, but preferably in the range of #600 to #2000.

The printing apparatus of the invention may employ electrothermal transfer films FL having two-color ink layers (red and black, blue and black, red and blue, or the like) arranged alternately in the direction of feed, so that characters may be printed in either one of the two colors.

An electrothermal transfer film FL may be coated successively with inks of yellow, magenta, and cyan for generating full color images.

Figure 11:
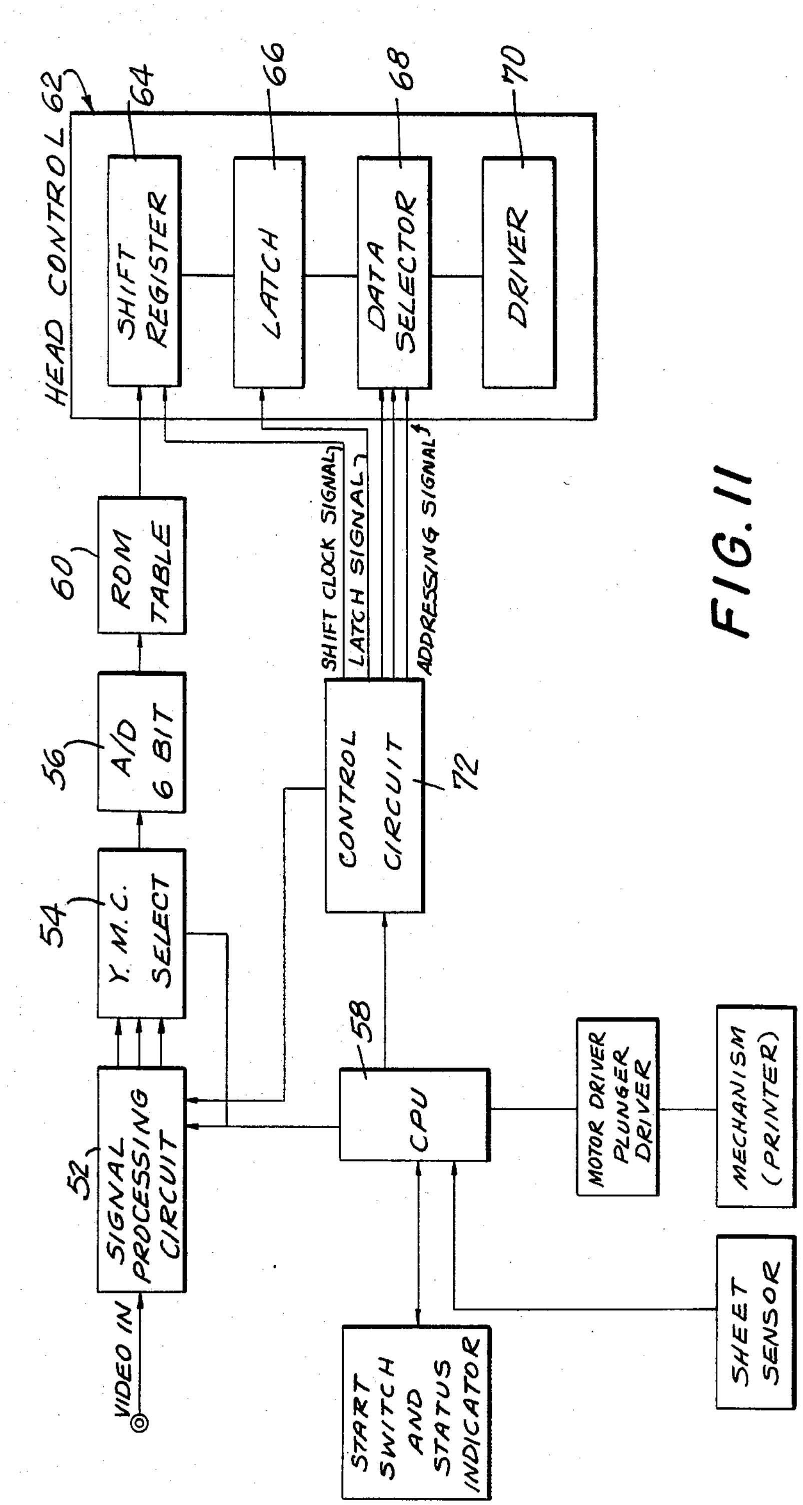
FIG. 11 is a block diagram of a circuit for a video printer which incorporates the printing apparatus of the present invention.

FIG. 11 is a block diagram of a signal processing system for a full-color video printer incorporating the printing apparatus of the present invention. In the embodiment of FIG. 11, the video input signal and the sequence of operation of the mechanism are primarily controlled by an 8-bit central processing unit (CPU) 58. The video signal is fed to signal processing circuit 52 which separates the video signal into Y, M, and C chrominance signals, which are then selected by YMC select 5 for conversion by 6-bit A/D converter 56 into digital signals. The digital signals are fed to ROM table 60 which produces a serial signal matching the density characteristics of the printer of the invention and feeds the serial signal to print head control circuit 62. Print head control circuit 62 is composed of serial-parallel shift register 64, latch 66, data selector 68 for time-sharing drive, and driver 70. Shift register 64, latch 66, and data selector 68 are supplied with a shift clock signal, a latch signal, and an address signal, respectively, from control circuit 62 whose operation is regulated by CPU 58.

For forming a one-frame color image on a transfer recording sheet, the image is first printed using a yellow section of the ink film, then a magenta section, and finally a cyan section. Each of the three-color portions of the electrothermal transfer film FL has an ink layer extending over an area corresponding to one frame. Each time one color image is printed on a transfer recording sheet PA, the recording sheet is wound back for printing in another color.

The relationship between print head HE and ink film FL has mainly been described to show that the fusing of the ink layer of the electrothermal transfer film FL produces image transfer without error when the print head HE is operated under constant conditions.

Thus, the problems in making an effective printing apparatus are substantially solved as described above. However, the transfer recording body is improved, as described below, so as to be useful for the printing of superimposed colors or the clear printing of small dots.

The transfer recording body PA may be paper, a plastic film, or paper or plastic film which is coated with a resin. The resin may be organic or it may be inorganic, such as silicon dioxide. Although the recording body PA may be plain paper, small dots having diameters ranging from 40 to 70 μm can be clearly printed by employing paper, a plastic film, or a combination thereof that has a smoothness of 1000 sec or more, expressed in Bekk units since the electrothermal transfer film FL and the recording body PA are more uniformly held during printing against each other by the print head HE and the platen PT.

EXAMPLES OF RECORDING PAPER

Plain paper having a thickness ranging from 50 to 80 μm may be coated with a smooth layer having a thickness ranging from 5 to 20 μm. The coated layer may be of acrylic resin, urethane, polyester, PET, SBR (styrene-butadiene rubber), or the like.

A plastic film of a thickness ranging from 40 to 100 μm may be coated as above with a smooth layer having a thickness in the range of 10 to 50 μm. The plastic film may be of polyester, PET, polyethylene, polystylene, polypropylene, or the like. In the event that the smooth-coated layer is a good ink absorber, and where color printing is to be effected by superimposing colors, the first ink layer will not project upwardly, and hence the next ink layer can be printed with good smoothness and uniform pressure. In addition to improving smoothness, the coated resin layer is thus capable of good color printing.

However, the recording paper may be so constructed as to not absorb ink (or the ink may be such as does not permeate the recording paper) so that an applied ink layer will project onto the recording paper. With this modification, ink is in a fused state when the print head is in contact with the electrothermal transfer film, and thereafter is solidified, and hence there will be no problem of smoothness.

Also, the platen PT in the printing apparatus of the invention need not necessarily be cylindrical in shape, but may be flat.

The best results were achieved by the printing apparatus of the invention when the printing pressure ranged from 1.2 to 2.2 kg/cm$^2$. When the printing pressure was about 0.8 kg/cm$^2$, certain dots could not be printed if the heat generated in the dots was to be controlled and dots having diameters ranging from 40 μm to 70 μm were to be formed.

When the pressure rose to about 3 kg/cm$^2$, the electrothermal transfer film FL and recording paper PA were wrinkled at the time they were fed along, and the paper was stained all over under the pressure of the print head HE.

The polarities of adjacent recording electrodes in print head HE may be switched around. More specifically, if one of two adjacent recording electrodes DD is at a positive potential while the other recording electrode is made negative at a predetermined time in a printing cycle, they may be switched to negative and positive potentials, respectively, for printing in every other cycle or every other few cycles.

The print head HE may be so constructed that a plurality of signal electrodes for fusing ink are formed on one surface of substrate BO while electrodes for giving polarities opposite to those of the signal electrodes are formed on the other surface of substrate BO. The relationship between the hardness of the recording electrodes DD and the hardness of the substrate BO, and the relationship between angles Θ1 and Θ2 hold true for this modification.

The printing apparatus of the present invention can effect gradation printing by controlling the current and voltage applied to the print head so as to control the heat (Joule heat) generated in electrothermal transfer film FL. Control of the generated heat is effective in controlling the amount of ink to be transferred to the recording body PA.

Rather than controlling the amount of ink to be transferred for each dot, the density of dots to be transferred may be changed for gradation printing provided that the amount of ink transferred for each dot remains the same.

The printing apparatus of the invention may be used for "lift-off" by fusing ink which has been transferred to the recording body PA and erasing the fused ink.

The printing apparatus of the invention can be incorporated in electrothermal transfer printing apparatus which use slightly different principles. The present invention can also be used with electrothermal transfer films and recording papers which are more or less different from the illustrated embodiments.

Examples of such arrangements will be given below.

Figure 12:
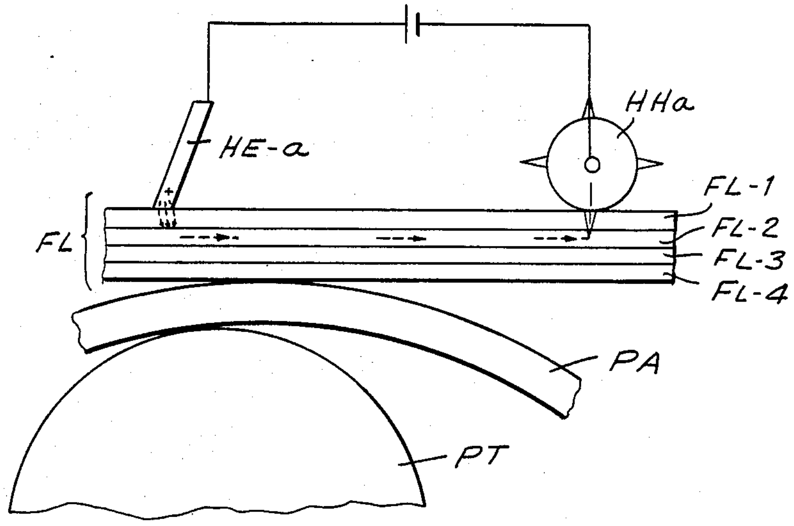
FIGS. 12 and 13 are views of additional embodiments of printing devices according to the present invention.

FIG. 12 is illustrative of another embodiment of a printing apparatus to which the present invention is applicable. Here, electrothermal transfer film FL is composed of a resistive layer FL-1, a metal layer FL-2, a base layer FL-3, and an ink layer FL-4. Print head HE-a has a multiplicity of recording electrodes which are arranged substantially perpendicular to film FL and are held in contact with resistive layer FL-1. Another recording electrode HHa is held in direct contact with metal layer FL-2 by means of spikes HHa-1, for example. The other recording electrode HHa comprises pointed, elongate electrodes made of metal such as iron, stainless steel, aluminum, and copper. The tip of each electrode projects through resistive layer FL-1 of electrothermal transfer film FL and contacts metal layer FL-2 so as to prevent the generation of heat in the connecting portion of the other recording electrode HHa and the electrothermal transfer film FL. The required heat for melting the ink is thus generated at the area of connection of print head HE-a with the electrothermal transfer film FL. Print head HE-a and recording electrode HHa are connected to a power supply as shown so that a current flows through the film FL in the direction of the arrows. A portion of the resistive layer FL-1 which is contacted by print head HE-a is heated by the current to cause ink to be transferred to a recording body PA.

Metal layer FL-2 need not be of metal but may be of carbon or the like. Metal layer FL-2, however, has an electric resistance much lower than that of resistive layer FL-1. Recording electrodes DD (not shown) of print head HE-a may be kept at a negative potential rather than the indicated positive potential. Base layer FL-3 is optional, depending upon the tensile strength of the other materials.

Figure 13:
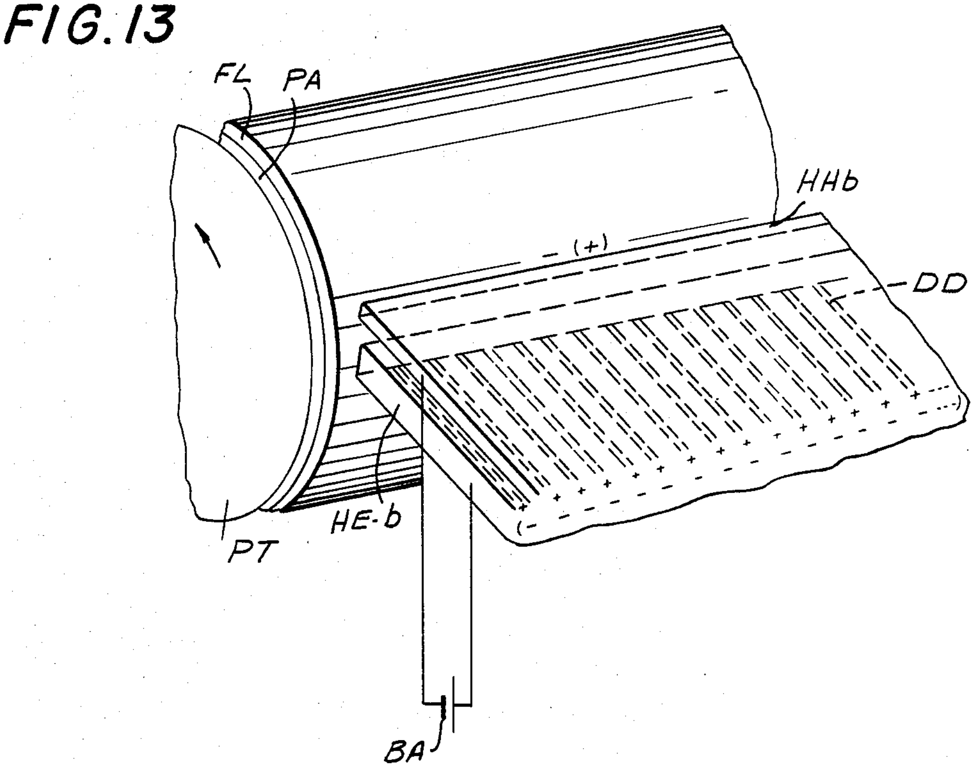

FIG. 13 shows a modification of the printing apparatus of the present invention. Print head HE-b has a multiplicity of recording electrodes DD which are all kept at a positive or a negative potential by power source BA. Another electrode HHb which is maintained at the opposite potential is held in line-to-line or plane-to-plane contact with the resistive layer in electrothermal transfer film FL at a distance which is suitably removed from print head HE-b. In this arrangement, the area of contact of electrode HHb with the resistive layer in film FL is greater than the area of contact of print head HE-b with the resistive layer, with the result that the heat generated in the portion of the film which is in contact with the electrode HHb is so small that the ink layer will not be fused. As recording electrodes DD in print head HE-b are spaced sufficiently from electrode HHb, the portion of the print head HE-b which is held against film FL for forming dots can be kept in a constant position.

The electrothermal transfer film FL may include a conductive layer which has a resistance substantially smaller than that of the resistive layer.

Electrode HHb may be positioned upstream of the position in which electrothermal transfer film FL contacts print head HE-b, e.g. in the direction of feed of film FL.

ADVANTAGES

The electrothermal transfer printing apparatus of the present invention is able to print dots at small intervals or pitches since the print head has finely spaced recording electrodes fabricated on a supportive substrate by means of thick film printing or the like.

Since the recording electrodes are pressed against the electrothermal transfer film at a predetermined angle, good printing quality can be maintained at all times.

Good printing quality can also be ensured by adjusting the relationship between the hardness of the recording electrodes and the hardness of the substrate.

Where the hardness of the recording electrodes is equal to or lower than that of the substrate, good printing can be maintained by cleaning the end of the print head at intervals. Better printing quality can be achieved by adjusting the angle at which the print head end is cleaned, selecting the surface roughness of the cleaning material used to a desired value, and by other refinements.

Colors can be printed in superimposed relation, or smaller dots can be printed, by employing a special transfer recording body.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

What is claimed is:

1. A printing apparatus for use with an electrothermal transfer film having a resistive layer and an ink layer which responds to heat produced by the passage of electric current through the resistive layer to transfer fusible ink to a recording body, the printing apparatus comprising:
   - print head means comprising a substrate carrying a plurality of recording electrodes; and
   - means for pressing the end surfaces of the recording electrodes into contact with the resistive layer of the electrothermal transfer film at an acute angle.

2. A printing apparatus for use with an electrothermal transfer film having a resistive layer and an ink layer which responds to heat produced by the passage of electric current through the resistive layer to transfer fusible ink to a recording body, the printing apparatus comprising:
   - print head means comprising a substrate carrying a plurality of recording electrodes;
   - means for pressing the ends of the recording electrodes into contact with the resistive layer of an eletrothermal transfer film at an acute angle; and
   - abrasive means positionable next to the print head means for grinding the end surface of the substrate and the ends of the electrodes after the film has been displaced past the print head means for a predetermined distance.

3. A printing apparatus in accordance with claim 2 and further comprising:
   - means for maintaining the electrode-carrying surface of the print head means during printing at an angle Θ2 relative to the area of the electrothermal transfer film which is being contacted and for positioning the end surface of the substrate during grinding at an angle Θ1 relative to the electrode-carrying surface of the substrate, the angle Θ2 being less than the angle Θ1.

4. A printing apparatus in accordance with claim 3, wherein the difference between the angles Θ1 and Θ2 is between three degrees and thirty degrees.

5. A printing apparatus in accordance with claim 3, wherein the electrodes have a hardness which is less than or equal to the hardness of the substrate.

6. A printing apparatus in accordance with claim 3 in which the substrate on which the electrodes are formed is formed of a material composed mainly of magnesium, silicon, aluminum, postassium, fluorine and oxygen.

7. A printing apparatus in accordance with claim 3 in which the recording electrodes are formed of a material selected from the group consisting of tungsten having a hardness of from 700–1000 HV, tungsten molybdenum having a hardness of from 700–800 HV, molybdenum manganese having a hardness of from 500–700 HV, molybdenum having a hardness of from 400–650 HV, and manganese having a hardness of from 300–500 HV.

8. A printing apparatus in accordance with claim 2 in which the hardness of the electrodes is greater than the hardness of the substrate, in which the print head means has an end surface which is slanted at an obtuse angle with respect to the surface of the substrate on which the electrodes are carried, and in which the electrothermal transfer film and the end surface of the substrate are maintained in substantially parallel relation to each other when positioned for sliding contact in printing.

9. A printing apparatus in accordance with claim 1 wherein the substrate comprises a material selected from the group consisting of a porous ceramic alumina, a ceramic composed mainly of magnesium, and a composition composed mainly of magnesium, silicon, aluminum, postassium oxide flourine and $O_2$.

10. A printing apparatus in accordance with claim 1 wherein the electrodes comprise a material selected from the group consisting of tungsten, tungsten molybdenum, molybdenum manganese, molybdenum, and manganese.

11. A printing apparatus in accordance with claim 10 in which the substrate comprises a porous ceramic composed mainly of alumina.

12. A printing apparatus in accordance with claim 10 wherein the substrate comprises a ceramic formed mainly of magnesium and silicon.

13. A printing apparatus in accordance with claim 10 wherein the substrate comprises a composition composed mainly of magnesium, silicon, aluminum, potassium, fluorine and oxygen.

14. A printing apparatus in accordance with claim 2, wherein the recording electrodes have a height of between 10 and 100 micrometers above the surface of the substrate on which they are carried.

15. A printing apparatus in accordance with claim 14, wherein each of the electrodes has a width between approximately 0.4 and approximately 0.7 times the pitch at which the electrodes are spaced apart at the end surface of the substrate.

16. A printing apparatus in accordance with claim 2, wherein each of the electrodes has a width which is approximately 0.4 to approximately 0.7 times the pitch at which the electrodes are space apart at the end of the substrate.

17. A printing apparatus in accordance with claim 1, wherein the electrodes comprise wires bonded to the substrate.

18. A printing apparatus in accordance with claim 17 in which the electrodes are made of tungsten wire.

19. A printing apparatus in accordance with claim 17, wherein the wires are bonded to a substrate by an inorganic glass adhesive.

20. A printing apparatus in accordance with claim 2, wherein the print head means further comprises:

an insulating layer formed over the lengths of the electrodes, the insulating layer having a hardness which is substantially less than the hardness of the electrodes.

21. A printing apparatus in accordance with claim 20, wherein the insulating layer ends slightly behind the end of each electrode.

22. A printing apparatus in accordance with claim 20, wherein the insulating layer is made of a material selected from the group consisting of epoxy resin, acrylic resin, urethane, silicone, and PET.

23. A printing apparatus in accordance with claim 1, wherein the electrodes are fabricated by thick film printing on the substrate.

24. A printing apparatus in accordance with claim 2, wherein the print head comprises a substrate formed as a green sheet on which the electrodes have been printed in the form of a thick conductive film, the whole having been baked.

25. A printing apparatus in accordance with claim 2, wherein the electrodes each comprise a thick film printed on the substrate, there being a conductive surface plated on each of the electrodes.

26. A printing apparatus in accordance with claim 25, wherein the thick film printed on the substrate has a thickness in the range of 8 to 15 micrometers and the conductive surface plated thereon has a thickness of 5 to 10 micrometers, yielding an over-all thickness in the range of 10 to 30 micrometers.

27. A printing apparatus in accordance with claim 25, wherein the thick film printed on the substrate comprises a material selected from the group consisting of silver palladium, silver paste, gold paste, and copper paste.

28. A printing apparatus in accordance with claim 25, wherein the conductive surface plated on the thick film comprises a material selected from the group consisting of layer of nickel, rhodium, and a mixture or composite of nickel and silicon carbide.

29. A printing apparatus in accordance with claim 7, wherein the recording electrodes are formed of a combination of one or more of said materials and an insulating material.

30. A printing apparatus in accordance with claim 29, wherein the insulating material is selected from the group including alumina, glass powder, glass fiber, and silicon oxide powder and is in the range of 5 to 20 percent by weight.

31. A printing apparatus in accordance with claim 10, wherein the recording electrodes are formed of a combination of one or more of said materials and an insulating material.

32. A printing apparatus in accordance with claim 31, wherein the insulating material is selected from the group including alumina, glass powder, glass fiber, and silicon oxide powder and is in the range of 5 to 20 percent by weight.

33. A printing apparatus in accordance with claim 2, wherein the abrasive means for grinding the print head means comprises a grinding material having a fineness of at least #500.

34. A printing apparatus in accordance with claim 2, wherein the abrasive means for grinding the ends of the electrodes comprises a grinding material having a fineness of less than or equal to #2500.

35. A printing apparatus in accordance with claim 2, wherein the abrasive means for grinding the ends of the electrodes comprises a grinding material disposed on the electrothermal transfer film.

36. A printing apparatus in accordance with claim 34, wherein the abrasive means is disposed at about at least one of the beginning and the end of the length of the transfer film.

37. A printing apparatus in accordance with claim 2 in which the abrasive means for grinding the print head means comprises at least a portion of the surface of the platen means which carries a material for grinding.

38. A printing apparatus in accordance with claim 1, wherein the transfer recording body has a smoothness of at least 1000 sec in Beck units.

39. A printing apparatus in accordance with claim 38, wherein the transfer recording body further comprises a coated, smooth layer of a material selected from the group consisting of an acrylic resin, urethane, polyester, PRT and styrene butadiene rubber.

40. A printing apparatus in accordance with claim 39, wherein the supporting material of transfer recording body comprises one of plain paper and a plastic film.

41. A printing apparatus in accordance with claim 2, wherein the transfer recording body is permeable to ink so as to be suitable for superimposed printing.

42. A printing apparatus in accordance with claim 2 in which the substrate of the print head means is made of an electrically insulating material.

43. A printing apparatus in accordance with claim 42 in which the electrically insulating material forming the print head substrate comprises a material selected from the group consisting of alumina, glass powder, glass fiber, and silicon oxide powder.

44. A printing apparatus in accordance with claim 2, wherein the means for refreshing the ends of the electrodes comprises a grinding material on the leading end of the electrothermal transfer film.

45. A printing apparatus in accordance with claim 2, wherein the means for refreshing the ends of the electrodes comprises a grinding material disposed at the trailing end of the electrothermal transfer film.

46. A printing apparatus in accordance with claim 2, wherein the means for refreshing the ends of electrodes comprises an electrothermal transfer film of greater length than the maximum length of film which can pass the print head without resulting in wear such that the print head fails to print satisfactorily, there being grinding material provided on the surface of the electrothermal transfer film at about the start and at about the end of at least one such maximum length.

47. A printing apparatus in accordance with claim 1, wherein the substrate of the print head means comprises a substantially rigid sheet of insulating material and the electrodes comprise a plurality of signal electrodes on one side of the sheet for contacting the surface of the resistive layer and a second plurality of electrodes on the opposite side of the sheet for contacting the resistive layer with voltage polarities opposite to those of the signal electrodes.

48. A printing apparatus for use with an electrothermal transfer film in accordance with claim 1, wherein the transfer film includes a conductive layer having one side in direct contact with the resistive layer, the ink layer lying on the other side of the conductive layer, and further comprising:

second electrode means comprising a plurality of pointed, elongate elements, the second electrode means supported to cause the pointed, elongate elements into contact with the conductive layer of the thermoelectric transfer film.

49. A printing apparatus in accordance with claim 48, wherein the second electrode means further comprises:

means on which the pointed, elongate elements are supported for motion into and out of contact with the conductive layer of the thermoelectric transfer film.

50. A printing apparatus in accordance with claim 48, wherein the conductive layer is metallic.

51. A printing apparatus in accordance with claim 48, wherein the conductive layer is carbon.

52. A printing apparatus in accordance with claim 48 and further comprising:

a base layer between the conducting layer and the ink layer.

53. A printing apparatus in accordance with claim 48, wherein the resistance of the conductive layer in the electrothermal transfer film is substantially less than that of the resistive layer.

54. A printing apparatus in accordance with claim 2, and further comprising:

a second electrode held in one of linear and planar contact with the resistive layer of the electrothermal transfer film and spaced apart from the print head means, the area of contact of the second electrode means with the resistive layer being greater than the area of contact of the print head means with the resistive layer so that heat generated in the resistive layer adjacent to the second electrode means is insufficient to fuse the ink layer.

55. A printing apparatus for use with an electrothermal transfer film having a resistive layer and an ink layer, the ink layer responsive to heat which is generated by the passage of electric current through the resistive layer to transfer fusible ink to a recording body, the printing apparatus comprising:

print head means comprising a substrate having an end surface at which the ends of a plurality electrodes are exposed, the print head means supporting the electrodes for sliding engagement with the resistive layer; and abrasive means supported for movement to a position next to the ends of the electrodes for grinding the electrodes when a predetermined length of the transfer film has been displaced past the print head means.

56. A printing apparatus in accordance with claim 55, and further comprising:

means for maintaining the electrode-carrying surface of the print head means during printing at an angle Θ2 relative to the area of the electrothermal transfer film and for positioning the end surface of the substrate during grinding at an angle Θ1 relative to the electrode-carrying surface of the substrate, the angle Θ2 being less than the angle Θ1.

57. The printing apparâtus in accordance with claim 56, wherein the difference between the angle Θ1 and the angle Θ2 is between three degrees and thirty degrees.

58. A printing apparatus in accordance with claim 56, wherein the electrodes have a hardness which is less than or equal to the hardness of the substrate.

59. A printing apparatus in accordance with claim 55, wherein the means for grinding the print head means comprises a grinding material having a fineness of at least #500.

60. A printing apparatus in accordance with claim 55, wherein the means for grinding the ends of the electrodes comprises a grinding material having a fineness of less than or equal to #2500.

61. A printing apparatus in accordance with claim 55, wherein the means for grinding the ends of the electrodes comprises a grinding material disposed on the electrothermal transfer film.

62. A printing apparatus in accordance with claim 55, wherein the means for positioning the electrothermal transfer film and the transfer recording body against the print head means comprises a platen, at least a portion of the surface of the plate comprising a material for grinding the print head means.

63. The method of printing on a recording body by means of an electrothermal transfer film having a resistive layer and an ink layer which responds to heat produced by the passage of current through the resistive layer to fuse ink to a recording body, the method comprising the steps of:

forming a print head by placing a plurality of recording electrodes on a surface of a substrate;

pressing the ends of the recording electrodes into contact with the resistive layer of an electrothermal transfer film at an acute angle;

sliding the print head and the resistive layer relative to one another to replace the film used in printing with unused film; and after a predetermined interval of sliding wear of the electrothermal transfer film on the print head, grinding the electrodes and the substrate so as to maintain effective contact of the electrodes with the resistive layer.

64. The method of printing of claim 63, including the further step of:

positioning the electrode-carrying surface of the substrate at an angle Θ2 relative to the electrothermal transfer film during printing, and positioning the end surface of the substrate at an angle Θ1 relative to the electrode-carrying surface of the substrate during grinding, the angle Θ2 being less than the angle Θ1.

65. The method of printing in accordance with claim 64, wherein the difference between the angles Θ1 and Θ2 is between about three degrees and about thirty degrees.

66. The method of printing in accordance with claim 63 and comprising the further step of:

providing the electrodes with a hardness which is equal to or less than the hardness of the substrate.

67. The method of printing of claim 63 and comprising the further steps of:

providing electrodes which have a hardness equal to or greater than the hardness of the substrate;

providing the substrate of the print head with an end surface which intersects the electrode-carrying surface at an obtuse angle; and while holding the print head means and the thermal transfer film in sliding contact with each other for printing, maintaining the end surface of the substrate substantially parallel to the contacted area of the thermoelectric transfer film.

68. The method of printing of claim 63 and comprising the further step of:

providing the electrodes on the substrate of the printing head with a height of between ten and thirty micrometers.

69. The method of claim 63 and comprising the further step of:

providing the electrodes on the substrate with a width which is approximately 0.4 to approximately 0.7 times the pitch at which the electrodes are spaced apart.

70. The method of printing of claim 63, wherein the step of grinding comprises the steps of:

pressing the abrasive surface of a sheet of abrasive material against the worn ends of the electrodes; and moving the abrasive surface while maintaining it in contact with the electrodes to grind off a portion of the electrodes.

71. The method of printing of claim 63, and comprising the further step of:

establishing the length of electrothermal transfer film can slide by the print head without resulting in unacceptable printing; and grinding the electrodes and the substrate so as to recondition them for effective printing prior to the passage of the electrothermal film for said distance.

72. The method of printing of claim 63, wherein the electrothermal transfer film is slid past the print head by a motor, and comprising the further steps of:

counting the revolutions of the motor to establish the predetermined interval.

73. The method of printing of claim 63 in which distance markers are spaced apart along the electrothermal transfer film and comprising the further step of:

counting the number of distance markers which have passed the print head to establish the predetermined distance.

74. A printing apparatus in accordance with claim 1 in which the substrate comprises a soft glass ceramic.

75. A printing apparatus in accordance with claim 1 wherein the means for positioning the print head means presses the end surfaces of the electrodes into sliding engagement with the resistive layer so that the print head defines an angle of from approximately thirty degrees to approximately sixty degrees with the resistive layer.

76. The method of printing of claim 63 and further comprising:

positioning the print head means with the end surfaces of the electrodes in sliding engagement against the resistive layer of the electrothermal transfer film and so that the recording electrode defines an angle of from approximately thirty degrees to approximately sixty degrees with the resistive layer.

77. A print head for an electrothermal printing apparatus which uses an electrothermal transfer film, the print head comprising:

substrate means comprising a plurality of recording electrodes, the substrate menas being substantially rigid and the recording electrodes having a hardness which is greater than or equal to the hardness of the substrate; and means for pressing the ends of the recording electrodes into contact with the resistive layer of the electrothermal transfer film at an acute angle.

78. A print head in accordance with claim 77, wherein the substrate means comprises a material selected from the group consisting of a porous ceramic alumina, a ceramic composed mainly of magnesium, and a composition composed mainly of magnesium, silicon, aluminum, potassium oxide and fluorine.

79. A print head in accordance with claim 77, wherein the electrodes comprise a material selected from the group consisting of tungsten, tungsten molybdenum, molybdenum manganese, molybdenum, and manganese.

80. A print head in accordance with claim 77, wherein the substrate comprises a porous ceramic composed mainly of alumina.

81. A print head in accordance with claim 77, wherein the substrate comprises a ceramic formed mainly of magnesium and silicon.

82. A print head in accordance with claim 77, wherein the substrate comprises a composition composed mainly of magnesium, silicon, aluminum, potassium, fluorine and oxygen.

83. A print head in accordance with claim 77, wherein the substrate on which the electrodes are formed is formed of a material composed mainly of magnesium, silicon, aluminum, potassium, fluorine and oxygen.

84. A print head in accordance with claim 77, wherein the recording electrodes are formed of a material sdelected from the group consisting of tungsten having a hardness of from 700–1000 HV, tungsten molybdenum having a hardness of from 700–800 HV, molybdenum manganese having a hardness of from 500–700 HV, molybdenum having a hardness of from 400–650 HV, and manganese having a hardness of from 300–500 HV.

85. A print head in accordance with claim 84, wherein the recording electrodes are formed of a combination of one or more of said materials and an insulating material.

86. The print head of claim 77 wherein the substrate means comprises a first surface along which the recording electrodes lie, and the substrate means comprising an end surface abutting first surface, the recording electrodes having ends which terminate at the end surface of the substrate.

* * * * *